April 21, 1925.
S. L. GOLDMAN
DECANTING APPARATUS
Filed Oct. 17, 1921
1,534,700
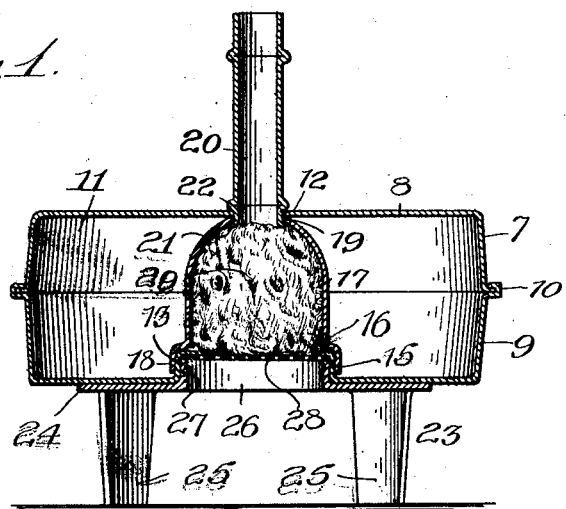
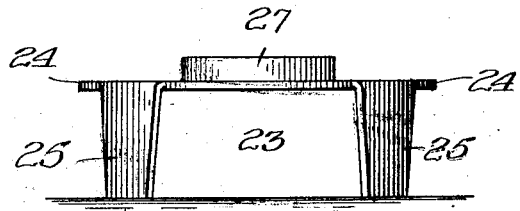
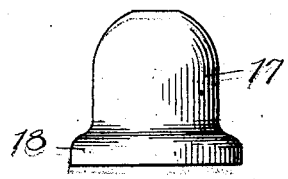
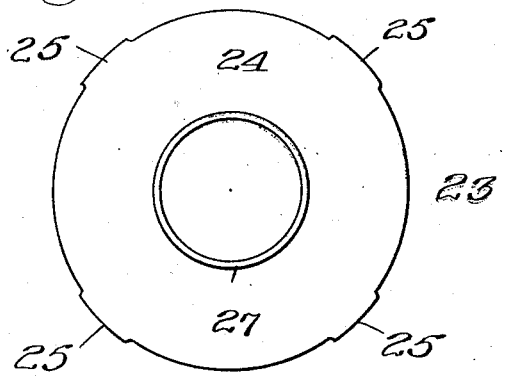
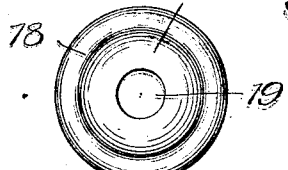
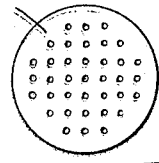
Inventor.
Sigmund L. Goldman,
By Dyrenforth, Lee, Chritton & Wiles,
Att'ys Patented Apr. 21, 1925.

1,534,700

UNITED STATES PATENT OFFICE.

SIGMUND L. GOLDMAN, OF CHICAGO, ILLINOIS.

DECANTING APPARATUS.

Application filed October 17, 1921. Serial No. 508,131.

*To all whom it may concern:*

Be it known that I, SIGMUND L. GOLDMAN, a citizen of the United States, residing at Chicago, in the county of Cook and State of Illinois, have invented a new and useful Improvement in Decanting Apparatus, of which the following is a specification.

My invention relates, more particularly, to decanting apparatus involving the use of a member which is positioned in the liquid to be decanted and containing a passage through which the liquid is withdrawn by suction action from the receptacle containing it.

My primary object is to provide improvements in members of the character referred to, to the end that these members shall operate effectually, to perform their purpose, be simple and economical of construction and readily cleansed of solid matter contained in the liquid and intercepted by the said member in the passage of the liquid therethrough.

As a premise to the following description it may be stated that certain of my improvements relate to a member of the character stated, whether this member is provided as a float member or as a sinker, whereas certain other features relate to the member provided as a float.

I have therefore shown my improvements as embodied in a member of the float type a description of the drawings being as follows:

Figure 1 is a view in vertical elevation of a float member constructed in accordance with my invention. Figure 2 is a view in side elevation of the base portion of the float. Figure 3 is a plan view of the base portion shown in Fig. 2. Figure 4 is a view in elevation of one of the parts of the float member and forming a part of the structure of Fig. 1. Figure 5 is a plan view of the member shown in Fig. 4; and Figure 6 a face view of a sieve member employed.

The particular construction shown in the drawings, and which is made, by preference, of sheet metal more preferably aluminum or tin, except for the body of filtering or screening material hereinafter referred to, comprises a hollow body portion 7 formed of an upper annular cup-shaped section 8 and a lower annular cup-shaped section 9, these sections being united at their adjacent peripheral edges at the open sides thereof, as represented at 10, to form a liquid-tight joint therebetween and to afford the chamber 11. The top wall of the section 8 is centrally apertured at 12 and the bottom wall of the section 9 is centrally apertured at 13, the aperture 13 being larger than the aperture 12, the aperture 13 being preferably formed in the upwardly-deflected portion of the bottom of the section 9, thus upwardly deflecting this part of the section causing the latter to present an annular rim-portion 15 terminating at its upper edge in an inwardly-extending annular flange 16. The device being described also comprises a member 17 of general dome shape and positioned in the chamber 11 centrally thereof, its lower portion being expanded to present the annular enlarged end portion 18 which telescopes, and forms a tight fit, with the upwardly-deflected rim portion 15. The top of the dome-member 17 is apertured as indicated at 19, this aperture being preferably of the same size and shape as the opening 12 with which it registers, and extending through the apertures 12 and 19 is an upwardly-extending pipe section 20 which opens at its lower end into the dome member 17. The pipe 20 is shown as deformed at its lower end to rigidly clamp this pipe and the dome 17 and casing section 8 together to form a fluid-tight joint therebetween, this being accomplished in the construction shown by forming an outwardly-extending annular flange 21 on the lower end of the pipe section 20 and an annular flange 22 on this pipe section above the upper wall of the casing section 8 between which flanges the metal forming the walls of the openings 12 and 19 is rigidly clamped, it being understood that the flanges 21 and 22 may be formed merely by deflecting the metal of the tube 20. The device is also formed with a base portion represented generally at 23 and preferably formed by stamping it from sheet metal, the primary purpose of this base being to prevent the body portion 7 from contacting with the bottom of the receptacle in which the liquid to be decanted is contained and thereby avoid the drawing through the device of any sediment which may have accumulated in the bottom of the receptacle. The base portion 23, as shown, comprises a disk-like portion 24 from which legs 25 depend, this disk containing an opening 26 therethrough flanked by an upwardly-extending annular flange 27 which enters the recess provided in the bottom of the body 7 and is so proportioned that it will fit the latter comparatively tightly to prevent accidental disengagement of the base 23 from the body member 7, the device being shown as provided with a strainer disk 28 located within the recess in the bottom of the member 7 and confined therein between the flanges 16 and 27.

The device is also shown as provided with a body represented at 29, of any suitable material, such as, for example, sponge, for intercepting solid particles in the liquid drawn through the device, this body of material being located within the dome member 17 and retained therein by the flange 16.

While the device as shown is provided with both a screening disk 28 and a body of filtering material 29, it will be readily understood that, if desired, either may be omitted, depending upon the character of solid material to be intercepted.

It will be understood that in the use of the device the engagement of the legs 25 with the bottom of the receptacle containing the liquid, prevents the device from lowering to a position in which the accumulated sediment in the bottom of the receptacle is drawn through the device.

In practice the tube 20 would preferably be connected at its upper end with a flexible tube (not shown) such as, for example, rubber through which the suction for decanting the liquid would be exerted, as for example by a siphoning action.

Where the device is in the form of a float as shown, the base portion 23 would preferably be of sufficiently heavy material to cause the float to descend as the liquid is withdrawn therethrough, in upright position and thus objectionable tipping of the float, which would cause air to be sucked into the passage, is prevented and the device will become properly seated at its legs 25 on the bottom of the receptacle when the liquid therein has been withdrawn to such a level that the legs contact with the bottom of the receptacle.

It will be readily understood from the foregoing that the device may be manufactured very economically, is highly effective for its intended purpose, and the parts of the structure readily cleaned.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A suction float comprising a hollow body formed with a hollow member secured thereto and open at its upper and lower ends, said hollow member affording a passage for the flow of liquid upwardly therethrough, said passage being out of communication with the space in said body, and a pipe connected with said body and communicating with said passage above the lower, inlet, end of the latter.

2. A suction float comprising a chambered body provided with a passage for the flow of liquid therethrough, said passage being out of communication with the chamber in said body and enlarged below its outlet end, said enlarged portion and said chamber being fixed with relation to each other, and filtering means extending into the enlarged part of said passage and across its inlet end.

3. A suction float comprising a chambered body affording a passage for the flow of liquid therethrough, said passage being out of communication with the chamber in said body and opening downwardly through said body, with a portion of said passage below its upper end of enlarged cross section, and a member at said enlarged portion of the passage extending inwardly and laterally relative to the latter, said enlarged portion and said chamber being fixed with relation to each other.

4. A suction float comprising a hollow member affording a passage for the flow of liquid therethrough, a portion of said passage below its upper end being of enlarged cross section, and an annular flange at said enlarged portion of the passage extending inwardly and laterally relative to the latter.

5. A suction float comprising a chambered body provided with a passage for the flow of liquid therethrough, a pipe connected with the upper, outlet, end of said passage, said passage opening at its inlet through the bottom of said body, and means extending laterally and inwardly relative to the wall of said passage for retaining therein filtering means.

6. A suction float provided with a passage for the flow of liquid therethrough, said passage containing means for retaining therein filtering means including an annular flange located below said filtering means.

7. A suction float formed of a pair of members of general cup shape secured together at their marginal edges to form a hollow body, said members containing openings therethrough, the wall of one of said openings being flanked by an annular flange extending into the space within said body, and a hollow member open at its opposite ends located within the chambered portion of said body, the lower end of said hollow member being telescoped with said annular flange, the ends of said hollow member registering with the openings in said cup-shaped members.

8. A suction float formed of a pair of members of general cup shape secured together at their marginal edges to form a hollow body, said members containing openings therethrough, a hollow member located within the space in said hollow body, said hollow member being open at its opposite ends and registering with the openings in said cup-shaped members, and forming a passage through the float out of communication with the chambered portion of said body, and a tubular member communicating at one end with the upper end of said hollow member and deformed to afford means for securing together said tubular member, said hollow member and one of said cup-shaped members.

9. A member containing a passage through which liquid from the body thereof in which said member is located, is drawn, and a rest for holding said member in spaced relation from the bottom of the receptacle containing said body of liquid, formed with a ring portion adapted to be inserted into the lower end of said passage for detachably connecting said rest with said member.

10. A member containing a passage through which liquid from the body thereof in which said member is located, is drawn, said passage containing an inwardly-extending flange, a rest for holding said member in spaced relation from the bottom of the receptacle containing said body of liquid, detachably connected with said member, and a perforated disk located between said flange and rest and held in place by the latter.

11. A suction float comprising a hollow body formed with a hollow member secured thereto and open at its upper and lower ends, said hollow member affording a passage for the flow of liquid upwardly therethrough, said passage being enlarged below its upper, outlet, end for receiving filtering means and said passage being out of communication with the space in said body, and filtering means extending into the enlarged part of said passage across its inlet end.

SIGMUND L. GOLDMAN.